(12) United States Patent
Tanabe

(10) Patent No.: US 7,269,492 B2
(45) Date of Patent: Sep. 11, 2007

(54) CONTROL SYSTEM

(75) Inventor: Itaru Tanabe, Naka (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 10/857,906

(22) Filed: Jun. 2, 2004

(65) Prior Publication Data
US 2004/0249478 A1    Dec. 9, 2004

(30) Foreign Application Priority Data
Jun. 3, 2003    (JP) ............................ 2003-158148

(51) Int. Cl.
*G06F 19/00*    (2006.01)
(52) U.S. Cl. ............................. 701/62; 701/51; 714/55
(58) Field of Classification Search ................ 701/1, 701/36, 51, 62; 714/1, 2, 23, 55
See application file for complete search history.

(56) References Cited

U.S. PATENT DOCUMENTS

| | | | |
|---|---|---|---|
| 4,234,920 A | 11/1980 | Van Ness et al. | |
| 4,635,258 A | 1/1987 | Salowe | |
| 5,408,648 A * | 4/1995 | Gokan et al. | ............... 714/23 |
| 5,602,736 A * | 2/1997 | Toya et al. | ................ 701/45 |
| 6,718,254 B2 * | 4/2004 | Hashimoto et al. | ......... 701/110 |
| 6,883,123 B2 * | 4/2005 | Hashimoto et al. | ........... 714/55 |
| 6,924,901 B1 * | 8/2005 | Otsubo et al. | ............. 358/1.13 |

FOREIGN PATENT DOCUMENTS

| | | |
|---|---|---|
| JP | 1-184502 A | 7/1989 |
| JP | 0 410 030 A1 | 1/1991 |
| JP | 10-3409 | 1/1998 |

OTHER PUBLICATIONS

European Search Report dated Apr. 10, 2006 (Three (3) pages).
Japanese Office Action dated May 15, 2007 with English translation (three (3) pages).

* cited by examiner

*Primary Examiner*—Gary Chin
(74) *Attorney, Agent, or Firm*—Crowell & Moring LLP

(57) ABSTRACT

To offer a control system that is not only equipped with a high fail-safe function but also capable of avoiding erroneous failure detection.

The CPU 110 outputs a drive signal DC for driving the load L according to the input signals from sensors S1 and S2 by means of the load drive element 120. The monitor IC 150 detects abnormal condition of equipment and outputs the first reset signal RES 1 for resetting the CPU 110 and also outputs the second reset signal RES2 when the first reset signal RES1 has been outputted for a specified number of times. The compulsory turn-off circuit 160 stops the output to the load L according to the second reset signal RES2 outputted from the monitor IC 150.

9 Claims, 7 Drawing Sheets

CONTROL SYSTEM

CLAIM OF PRIORITY

The present application claims priority from Japanese application serial no. JP2003-158148, filed on Jun. 3, 2003, the content of which is hereby incorporated by reference into this application.

FIELD OF THE INVENTION

The present invention relates to a control system, particularly to a control system used for a system that is required to be highly fail-safe.

BACKGROUND OF THE INVENTION

According to a known conventional control system, such as the one disclosed in the Japanese Application Patent Laid-Open Publication No. Hei 10-3409 (1998), fail-safe function has been maintained in such a manner that, when the microcomputer goes out of control and no watchdog signal is outputted, the monitor IC judges the microcomputer is out of control and outputs a mask signal, and immediately stops outputting control signals to the devices under control.

SUMMARY OF THE INVENTION

Control systems for automobile that have already been put into practical use include engine control unit (ECU) for controlling the engine, AT control unit (ATCU) for controlling automatic transmission, and motor control unit (MCU) for controlling the motor of hybrid automobile and electric automobile. When the microcomputer in these control systems for automobile goes out of control, it is necessary to actuate a fail-safe function so as to ensure the safety of the automobile. In addition, failure flag that tells the cause of malfunction is recorded for the ease of necessary repair and/or troubleshooting. The cause of the failure can be investigated by reading out the failure flag with a special tool.

A failure flag is set on in case where the microcomputer itself goes out of control. In addition, if, for example, the temperature of a controller goes higher than a specified temperature, it is regarded as failure, control signal output is stopped, and a failure flag is set on.

A problem involved in such a system is a transient failure resulting from a transient cause such as the following. An AT control unit called integrated transmission control module has been developed recently. In this integrated transmission control module, an AT control unit comprising an electrical system is built in the casing of the automatic transmission which is a mechanical portion. In this design, the temperature of the AT control unit becomes higher by about 50° C. than in a separate design where the AT control unit is installed inside the compartment. When, for example, the engine key is turned to the accessory (ACC) position after the automobile has run up a steep slope, the temperature of the AT control unit becomes temporarily higher than a preset temperature and so a failure flag is set on because the AT oil temperature of the automatic transmission increases and the pump for cooling the AT oil ceases to operate. When the engine key is once turned off after the above and consequently the AT oil temperature drops down, however, the engine can be started again but the failure flag is held on.

When a failure flag is on, the control unit is generally replaced to find out the cause of the failure. If the failure results from a temporary phenomenon such as transient temperature increase, however, the cause of the failure cannot be found out because the phenomenon cannot be reproduced. There has been a problem that any failure due to a transient phenomenon like the above is regarded as erroneous failure detection and that replacement of the control unit and/or investigation of the cause of the failure is needed although it is not a failure primarily. For the AT control unit of an integrated transmission control module, the automatic transmission itself must be replaced.

An object of the present invention is to offer a control system that is not only equipped with a high fail-safe function but also capable of avoiding erroneous failure detection.

(1) In order to achieve the above object, the present invention is a control system equipped with a control means that outputs, according to the input signals from sensors, a drive signal for driving a load by means of a load drive element, comprising a monitor means that detects abnormal condition of equipment and outputs the first reset signal for resetting the control means and also outputs the second reset signal when the first reset signal has been outputted for a specified number of times, and a compulsory turn-off means that stops the output to the load according to the second reset signal outputted from the monitor means.

With the above construction, the system is equipped with high fail-safe function and capable of avoiding erroneous failure detection.

(2) In the above (1), it is preferred that the compulsory turn-off means interrupts the drive signal supplied to the load drive element.

(3) In the above (1), it is preferred that the compulsory turn-off means stops supplying power to the load.

(4) In the above (1), it is preferred that the specified number of times which is the condition of outputting the second reset-signal can be specified from the outside.

(5) In the above (1), it is preferred that the monitor means outputs the second reset signal when the first reset signal has been outputted for a specified number of times within a specified length of time.

(6) In the above (1), it is preferred that the monitor means sets a failure flag on when the second reset signal is outputted.

DESCRIPTION OF THE PREFERRED EMBODIMENTS

Figure 1:
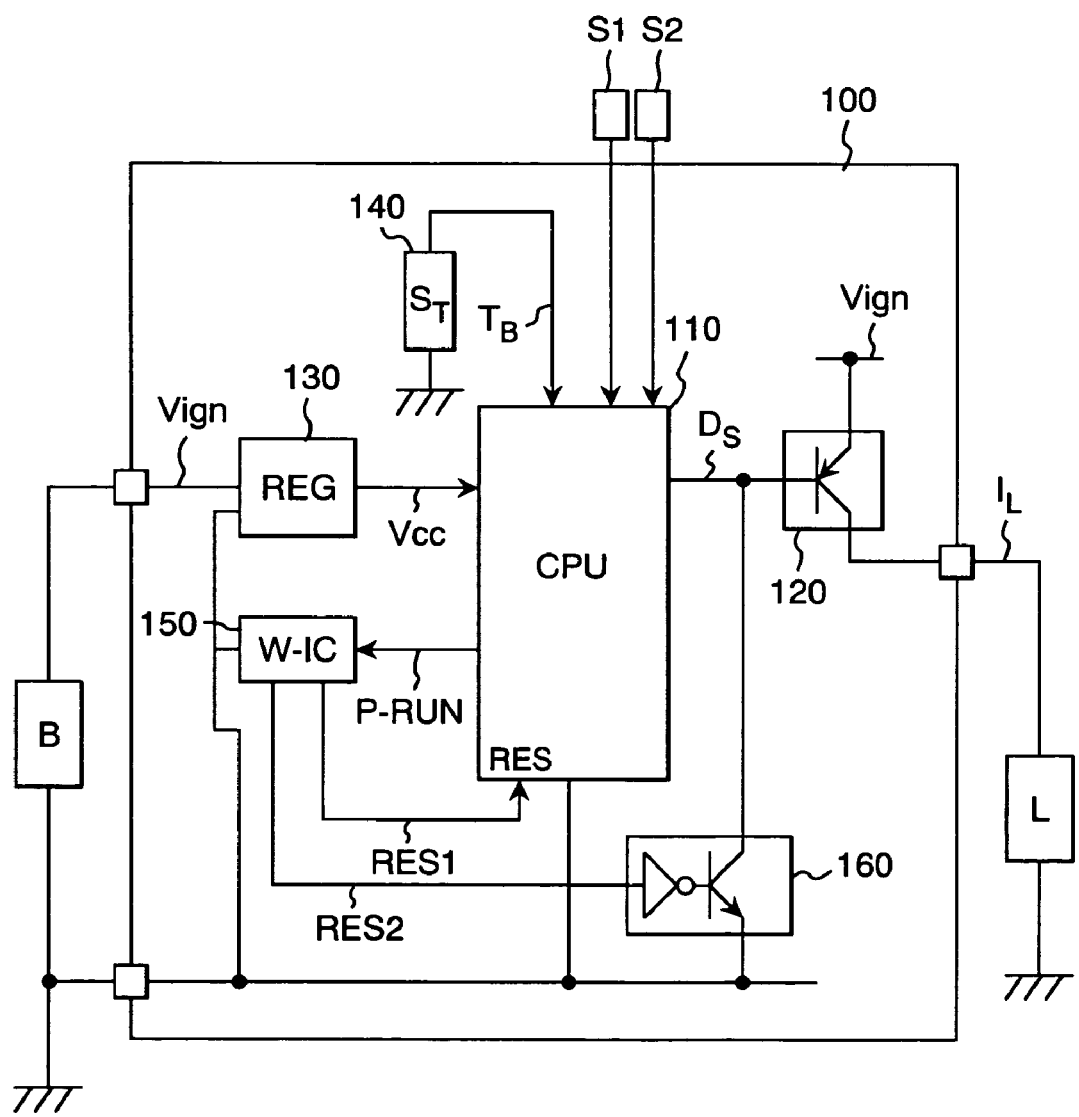
FIG. 1 is a block diagram showing the overall construction of the control system according to the first embodiment of the present invention.
Figure 2:
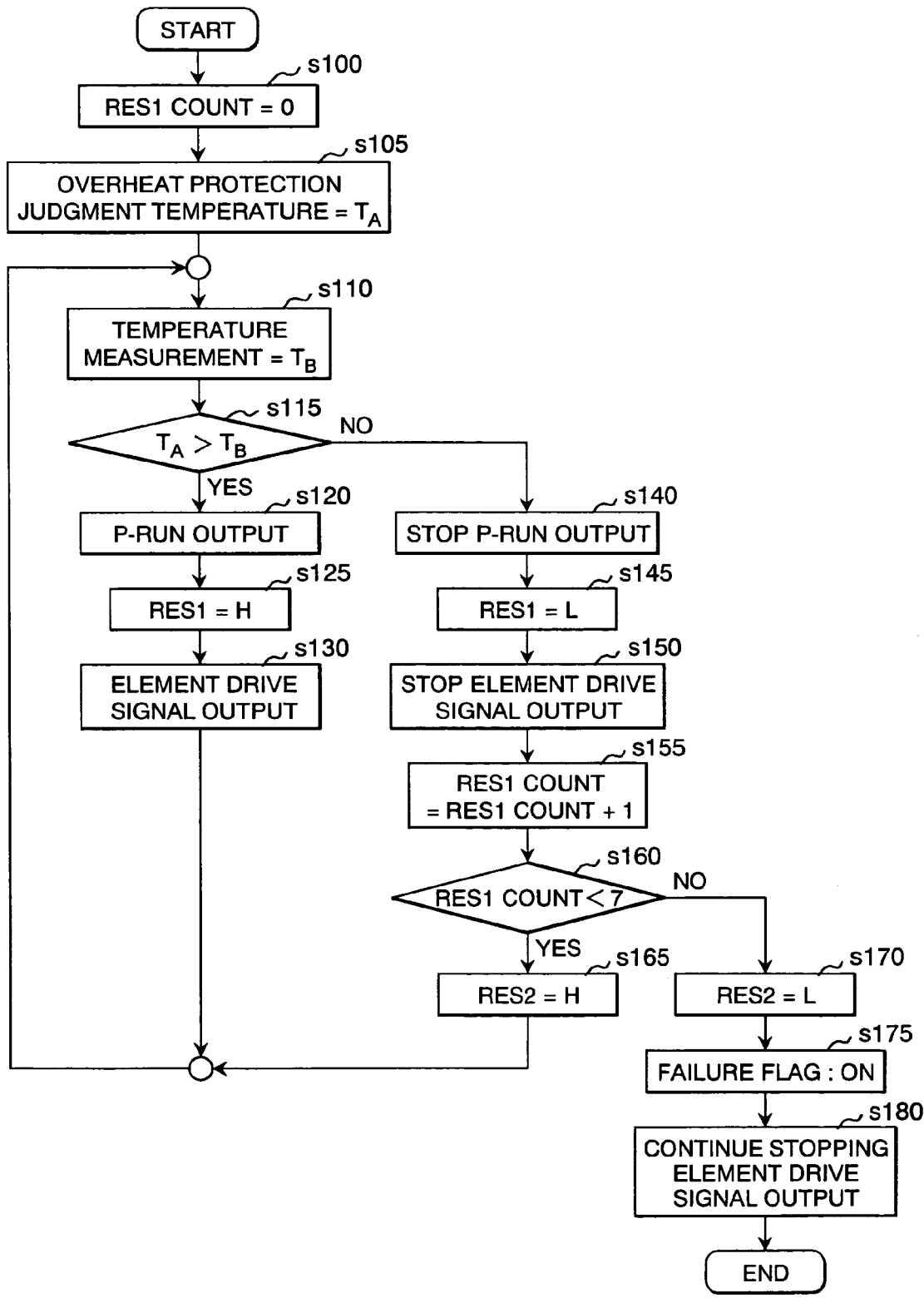
FIG. 2 is a flowchart showing the operation of the control system according to the first embodiment of the present invention.
Figure 3:
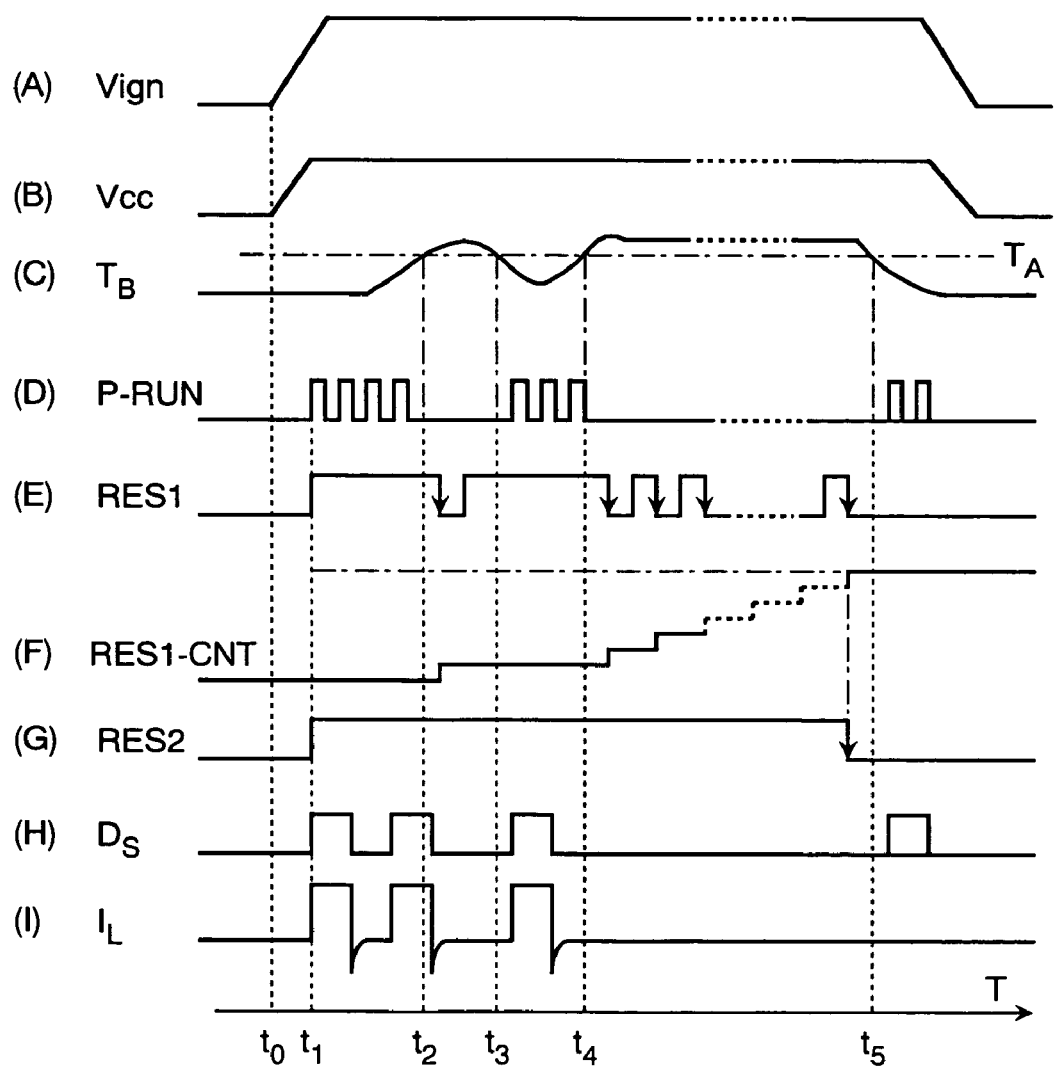
FIG. 3 is a waveform chart showing the operation of the control system according to the first embodiment of the present invention.

The construction and operation of the control system according to the first embodiment of the present invention is described hereunder, using FIG. 1 to FIG. 3. The description of the control system hereunder refers to an AT control unit of an integrated transmission control module.

To begin with, the overall construction of the control system of this embodiment is described, using FIG. 1.

FIG. 1 is a block diagram showing the overall construction of the control system according to the first embodiment of the present invention.

Control unit 100 comprises CPU 110 and load drive element 120. Signals indicating the condition of the vehicle are inputted to the CPU 110 from multiple external sensors S1 and S2. For an AT control unit, sensors S1 and S2 are generally accelerator pedal step-down sensor and vehicle speed sensor. The load drive element 120 is made of power transistor or the like. Load L is connected to the load drive element 120. Normally, multiple loads L are used. When multiple loads L are used, the same number of load drive elements 120 are provided, respectively. In an AT control unit, there are provided solenoid coils for driving the actuators that respectively connect and disconnect multiple clutches inside the automatic transmission.

The CPU 110 determines the gear shift of the transmission according to the signals from S1 and S2 indicating the condition of the vehicle and outputs a drive signal DS to the load drive element 120 for transmission control, for example, for disconnecting the first clutch and connecting the second clutch. When the drive signal DS turns to high level, the load drive element 120 is energized and a drive current is supplied from the power supply Vign to the load L. Voltage of battery B transformed into a specified voltage VCC (for example, 5 V) by regulator circuit 130 is supplied to the CPU 110.

In addition, the control system 100 is equipped with temperature sensor (ST) 140, monitor IC (W-IC) 150, and compulsory turn-off circuit 160. The temperature sensor 140 detects the temperature of the control system 100. The CPU 110 monitors the temperature of the control system 100 according to the output of the temperature sensor 140 and judges whether the CPU can be in normal operation. When the temperature detected by the temperature sensor 140 is lower than the specified temperature, the CPU 110 outputs periodic signals (in this description, they are, for example, periodic signals called P-RUN signal) to the monitor IC 150.

If the periodic signals outputted from the CPU 110 cease, the monitor IC 150 outputs a reset signal RES1 to the reset terminal RES of the CPU 110 to reset the CPU 110. The monitor IC 150 outputs the reset signal to the CPU 110 repeatedly for several times. Then, if the number of the reset signal outputs has reached a specified number, it outputs a reset signal RES2 to the compulsory turn-off circuit 160. When the reset signal RES 2 is inputted, the compulsory turn-off circuit 160, which is connected between the control input terminal of the load drive element 120 and ground potential, short-circuits the control input terminal of the load drive element 120 with the ground potential. Consequently, even if the CPU 110 outputs a drive signal DS, the load drive element 120 is turned off compulsorily and power supply to the load L ceases to stop driving the load. At the same time, a failure flag indicating a condition where a reset signal RES2 has been outputted to stop driving the load L is recorded inside the monitor IC 150.

Next, the operation of the control system of this embodiment is described hereunder, using FIG. 2 and FIG. 3.

FIG. 2 is a flowchart showing the operation of the control system according to the first embodiment of the invention. FIG. 3 is a waveform chart showing the operation of the control system according to the first embodiment of the invention. The horizontal axis in FIG. 3 represents the time T. FIG. 3(A) shows the voltage Vign of the battery B. FIG. 3(B) shows the output voltage VCC of the regulator circuit 130. FIG. 3(C) shows the temperature TB detected by the temperature sensor 140. FIG. 3(D) shows the periodic signal P-RUN outputted from the CPU 110 to the monitor IC 150. FIG. 3(E) shows the reset signal RES1 outputted from the monitor IC 150. FIG. 3(F) shows the count RES1-CNT which is the number of the reset signals RES1 counted by the monitor IC 150. FIG. 3(G) shows the reset signal RES2 outputted from the monitor IC 150. FIG. 3(H) shows the drive signal DS outputted from the CPU 110. FIG. 3(I) shows the load current IL through the load L.

In step s100 in FIG. 2, when the engine key of an automobile is turned on, the monitor IC 150 clears to zero the counter RES2COUNT that counts the number of outputs of the reset signals RES1. In the next step s105, the CPU 110 sets an overheat protection judgment temperature to TA for judging an overheated condition and actuating the fail-safe function. In other words, when the engine key of the automobile is turned on at time to, the voltage Vign of the battery B is supplied to the control system 100 as shown in FIG. 3(A) and the voltage VCC transformed by the regulator circuit 130 is supplied to the CPU 110 and monitor IC 150 as shown in FIG. 3(B), and each process in steps s100 and s105 is executed.

Next, in step s110, the CPU 110 receives a temperature signal from the temperature sensor 140 and measures the temperature TB. In step s115, the CPU 110 judges whether the measured temperature TB is lower than the overheat protection judgment temperature TA. If the measured temperature TB is lower than the overheat protection judgment temperature TA, the process flow proceeds to step s120 and, if the measured temperature TB is higher than the overheat protection judgment temperature TA, inclusive, it proceeds to step s140.

If the measured temperature TB is lower than the overheat protection judgment temperature TA, the CPU outputs periodic signals P-RUN to the monitor IC 150, starting from time t1 as shown in FIG. 3(D), in step s120. Then, in step s125, the monitor IC 150 sets the reset signal RES1 to "H" level, starting from time t1 as shown in FIG. 3(E). In step s130, the CPU 110 furthermore outputs the element drive signal DS, starting from time t1 as shown in FIG. 3(H).

On the other hand, if the measured temperature TB is higher than the overheat protection judgment temperature TA, inclusive, at time t2 as shown in FIG. 3(C), the CPU 110 stops outputting the periodic signals P-RUN to the monitor IC 150 as shown in FIG. 3(D) in step s140. In FIG. 3, a duration of time from t2 to t3 represents a case where the measured temperature TB exceeds the overheat protection judgment temperature TA temporarily and a duration of time from t4 to t5 represents a case where the measured temperature TB exceeds the overheat protection judgment temperature TA for a certain length of time.

Nest, in step s145, the monitor IC 150 sets the reset signal RES1 to "L" level as shown in FIG. 3(E). The system is so designed that the CPU 110 is reset when the signal inputted to the reset input terminal RES turns to "L" level. In the next step s150, the CPU 110 stops outputting the element drive signal DS, as shown in FIG. 3(H).

In step s155, which is the next process to step s150, the monitor IC 150 adds "1" to the count RES1-CNT, which is the count of the reset signals RES1 stored in the system. Then, in step s160, the monitor IC 150 judges whether the count RES1-CNT is smaller than "7" or not. If it is smaller than "7", the process flow proceeds to step s165 and, if it is greater than "7", inclusive, it proceeds to step s170.

If the temperature increases temporarily in a duration of time from t2 to t3 as shown in FIG. 3(C), the monitor IC 150 sets the reset signal RES2 to "H" level in step s165 because the count RES1-CNT is smaller than "7". Since the compulsory turn-off circuit 160 is equipped inside with a logical inverter as shown in FIG. 1, it does not operate with the reset signal RES2 is at "H" level.

The process flow returns back to step s110, and the processes above are repeated. When the measured temperature TB becomes lower than the overheat protection judgment temperature TA at time t3, the process flow then returns to step s120 and normal element drive operation is resumed through the processes in steps s125 and s130.

On the other hand, when the temperature stays higher than the overheat protection judgment temperature TA for a certain length of time from t4 to t5 as shown in FIG. 3(C), and if the count RES1-CNT is smaller than "7", the process flow from step s165 to step s115 and then steps s140 to s155 is repeated. Consequently, multiple times of the reset signals RES 1 are repeated as shown in FIG. 3(E). In the course of this process flow, the count RES1-CNT is increased one by one as shown in FIG. 3(F).

When the count RES1-CNT finally exceeds "7", the monitor IC 150 sets the reset signal RES2 to "L" level as shown in FIG. 3(G) in step s170. Consequently, the compulsory turn-off circuit 160 operates to turn off the load drive element 120 compulsorily and power supply to the load L ceases to stop driving the load.

In the next step s175, the monitor IC 150 sets the internal failure flag on. Then, in step s180, it continues stopping the element drive signal output. Because of this function, even if the measured temperature TB becomes lower than the overheat protection judgment temperature TA, for example, at time t5 and the CPU 110 outputs periodic signals P-RUN as shown in FIG. 3(D) and outputs a drive signal DS as shown in FIG. 3(H), no load current IL runs through the load L as shown in FIG. 3(I) and the element drive stoppage continues.

The above description is based on a case where the temperature of the control system 100 becomes higher and so the CPU 110 is operating normally. On the other hand, in case where the CPU 110 itself has failed for some reason, the system operates as follows.

If the CPU 110 of the control system 100 has failed for some reason, the CPU 110 no longer operates normally and therefore the load L may possibly be subjected to a serious condition, for example, being kept on for a long time and consequently heated abnormally, resulting in smoke or fire. Since the CPU 110 under the above condition can no longer output normal P-RUN signal, the monitor IC 150 detects abnormality of the CPU 110 and outputs a reset signal RES1. When the reset signal RES1 is inputted to the CPU 110, the CPU 110 is reset and, if it can be reset to a normal condition, it resumes normal control operation. However, if the CPU 110 cannot be reset to a normal condition, another reset signal RES1 is inputted to the CPU 110 so as to reset the CPU 110 to a normal condition. If the CPU 110 cannot be reset to a normal condition here again, another reset signal RES1 is inputted to the CPU 110 in the same routine. When the above routine is repeated for several time, the reset signal RES2 operates to actuate the compulsory turn-off circuit 160 and the element drive signal DS is set off compulsorily irrespective of the condition of the CPU 110, and hence the system ceases to drive the load L.

According to this embodiment, it becomes possible to offer a fail-safe function as described above suitable for a system where the fail-safe sensitivity of the control system should not be higher than required and yet switching to the fail-safe function be ensured. That is to say, this embodiment is particularly effective for a system to which a highly sensitive fail-safe function, such as the one according to the prior art where control is stopped even if a single abnormal condition is detected, cannot be applied (for example, a system that needs to minimize erroneous failure detection of the fail-safe function because replacing the control system is not so easy). Since the AT control unit of an integrated transmission control module is built in the casing of the automatic transmission, replacing the control unit is not so easy, that is, in replacing the control unit, the transmission must be disconnected first and then the control unit must be removed from the inside of the casing. This embodiment is effective for a system like the above.

In addition, since a failure flag is set on only in case the element drive signal output is stopped continuously, no failure flag is set on under a temporary temperature increase or the like, and accordingly trouble such as unnecessary replacement of the control system can be avoided.

In the description above, the system is so designed that a reset signal RES2 is outputted in case "the number of outputs of the reset signal RES1=7" is true, but this number can be set freely in conformance to the system to which this embodiment applies.

According to this embodiment, it becomes possible not only to be equipped with a high fail-safe function but also capable of avoiding erroneous failure detection as described above.

Figure 4:
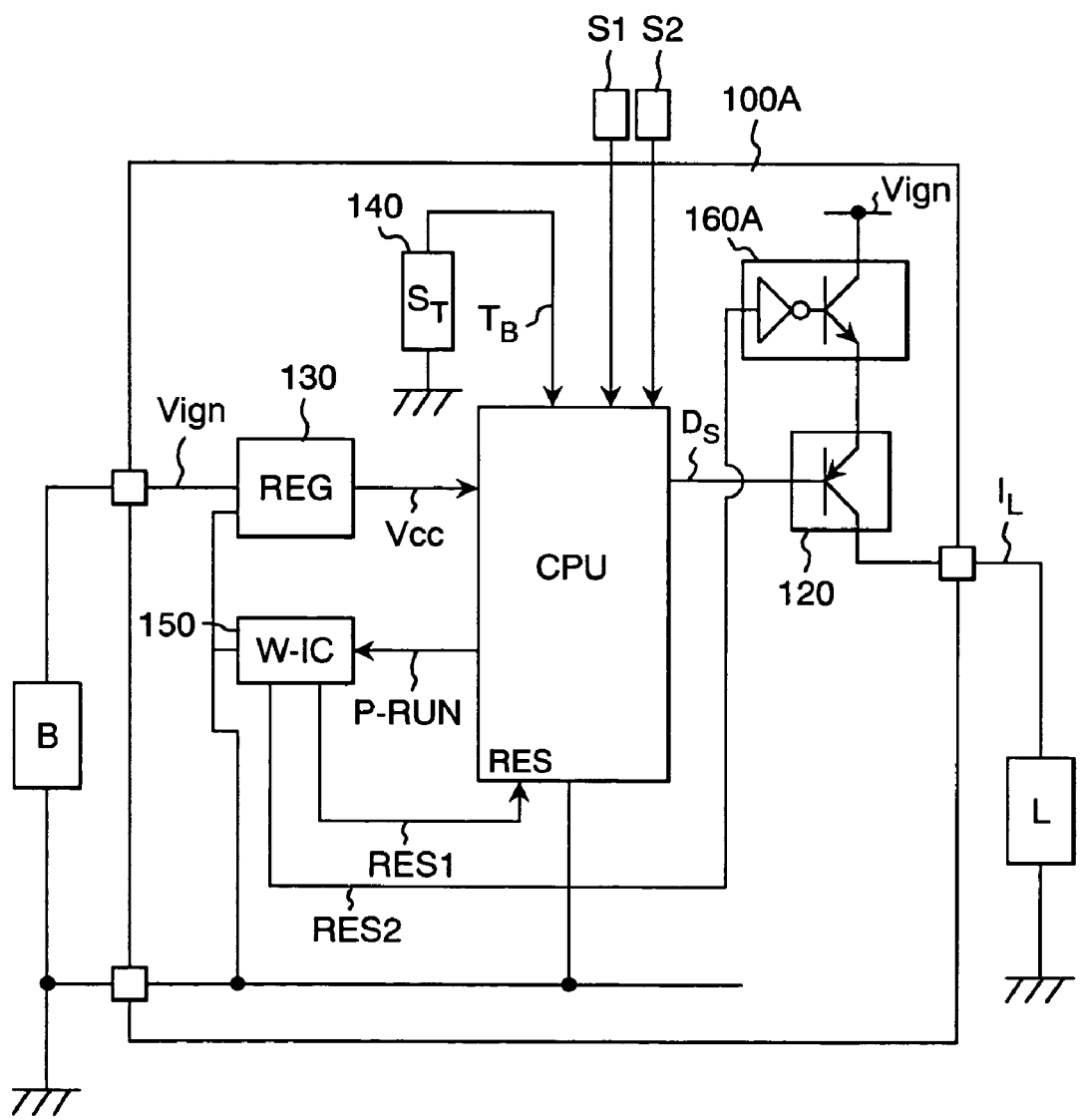
FIG. 4 is a block diagram showing the construction of the control system according to the second embodiment of the present invention.

Next, the construction of the control system according to the second embodiment of the present invention is described hereunder, using FIG. 4.

FIG. 4 is a block diagram showing the construction of the control system according to the second embodiment of the invention. The same symbols as used in FIG. 1 denote the same parts.

The basic construction of this embodiment is the same as in FIG. 1. In this embodiment, the control system 100A is equipped with a compulsory turn-off circuit 160A. The compulsory turn-off circuit 160A is connected between the power supply Vign and load drive element 120. The construction of the compulsory turn-off circuit 160A is the same as the compulsory turn-off circuit 160 in FIG. 1.

When the monitor IC 150 outputs the reset signal RES1 to the CPU 110, for example, seven times, it also outputs the reset signal RES2 to the compulsory turn-off circuit 160A at the same time and interrupts the connection between the power supply Vign and load drive element 120. Consequently, power supply to the load drive element 120 ceases and power supply to the load L ceases to stop driving the load.

According to this embodiment, it also becomes possible not only to be equipped with a high fail-safe function but also capable of avoiding erroneous failure detection as described above.

In the embodiment shown in FIG. 1, as the compulsory turn-off circuit 160 is actuated, the load drive element 120 is turned off compulsorily and so power supply to the load L ceases to stop driving the load. In the embodiment shown in FIG. 4, on the other hand, s the compulsory turn-off circuit 160A is actuated, the connection between the power supply Vign and load drive element 120 is interrupted and so power supply to the load drive element 120 ceases and power supply to the load L ceases to stop driving the load. In either embodiment, the compulsory turn-off circuit stops power supply to the load L to stop driving the load. Accordingly, so far as the system is equipped with the function above, its construction is not limited to ones shown in FIG. 1 and FIG. 4.

Figure 5:
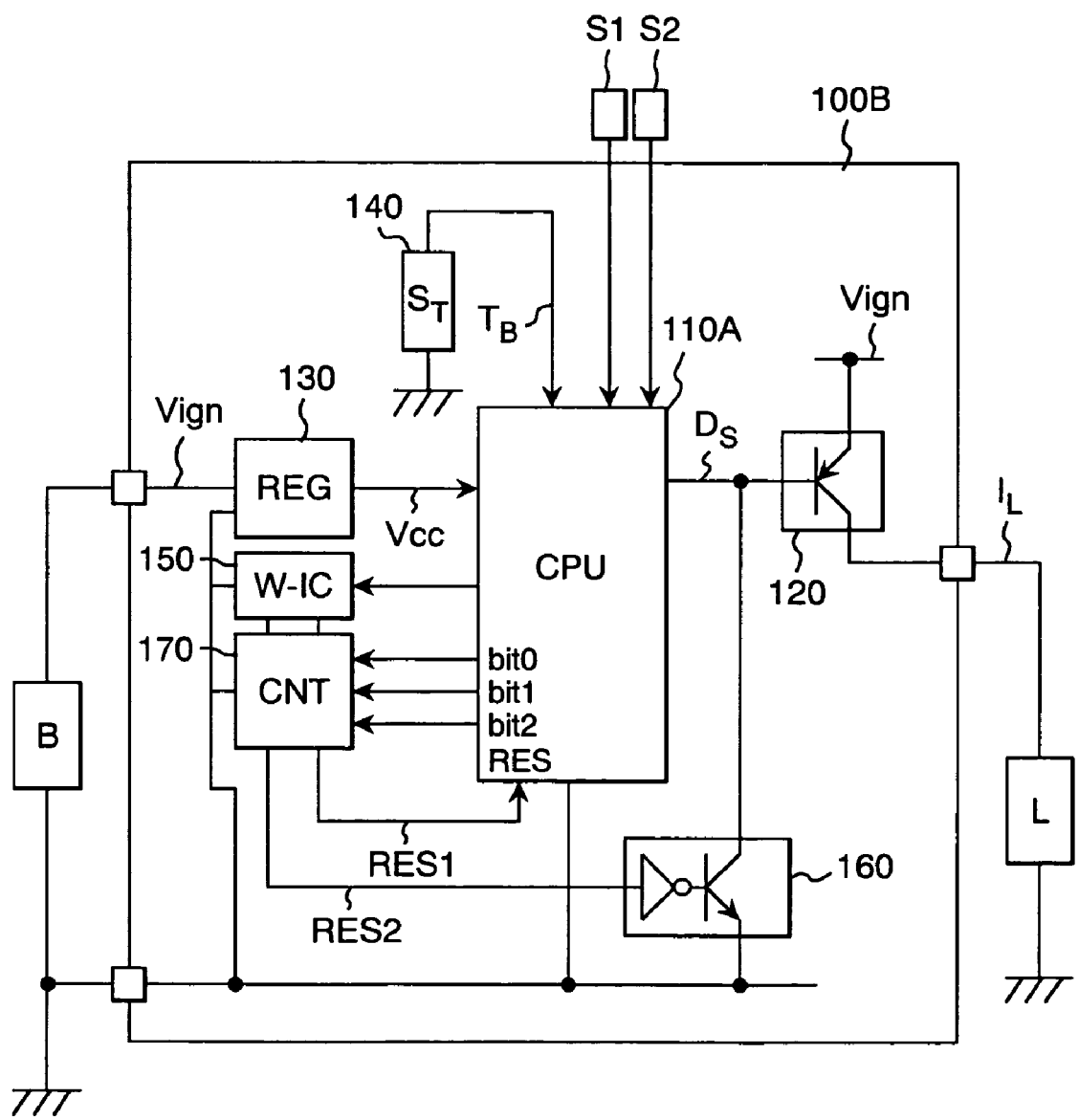
FIG. 5 is a block diagram showing the construction of the control system according to the third embodiment of the present invention.

Next, the construction of the control system according to the third embodiment of the present invention is described hereunder, using FIG. 5.

FIG. 5 is a block diagram showing the construction of the control system according to the third embodiment of the invention. The same symbols as used in FIG. 1 denote the same parts.

The basic construction of this embodiment is the same as in FIG. 1. In this embodiment, the control system 100B is equipped with a counter circuit 170. The counter circuit 170 is connected to the monitor IC 150 and so constructed that the 3-bit signals of bit0 to bit2 outputted from the CPU 110A are inputted.

In the embodiment shown in FIG. 1, the reset signal RES2 is actuated after the reset signal RES1 is outputted for a specified number of times (for example, seven times). The number of times is a prefixed number in the embodiment in FIG. 1. In this embodiment, on the other hand, the number of times of the reset signal RES1, which is the condition of actuating the reset signal RES2, can be set as a combination of 3-bit signals bit0, bit1 and bit2 outputted from the CPU 110A. That is, on a system in which the control system 100B is employed, a suitable condition of actuating the reset signal RES2 can be set to any one of nine numbers from zero to eight as a combination of three signal lines outputted from the CPU 110A. Accordingly, it is understood that the condition of actuating the reset signal RES2 suitable for a system in which the control system 100B is employed can be set very easily. Although the number of times of outputting the reset signal RES1, which is the condition of actuating the reset signal RES2, is set by three signal lines bit0 to bit2 in this embodiment, the number of the signal lines can be different.

According to this embodiment, it becomes possible not only to be equipped with a high fail-safe function but also capable of avoiding erroneous failure detection as described above. In addition, the condition of actuating the reset signal RES2 can be set easily.

Figure 6:
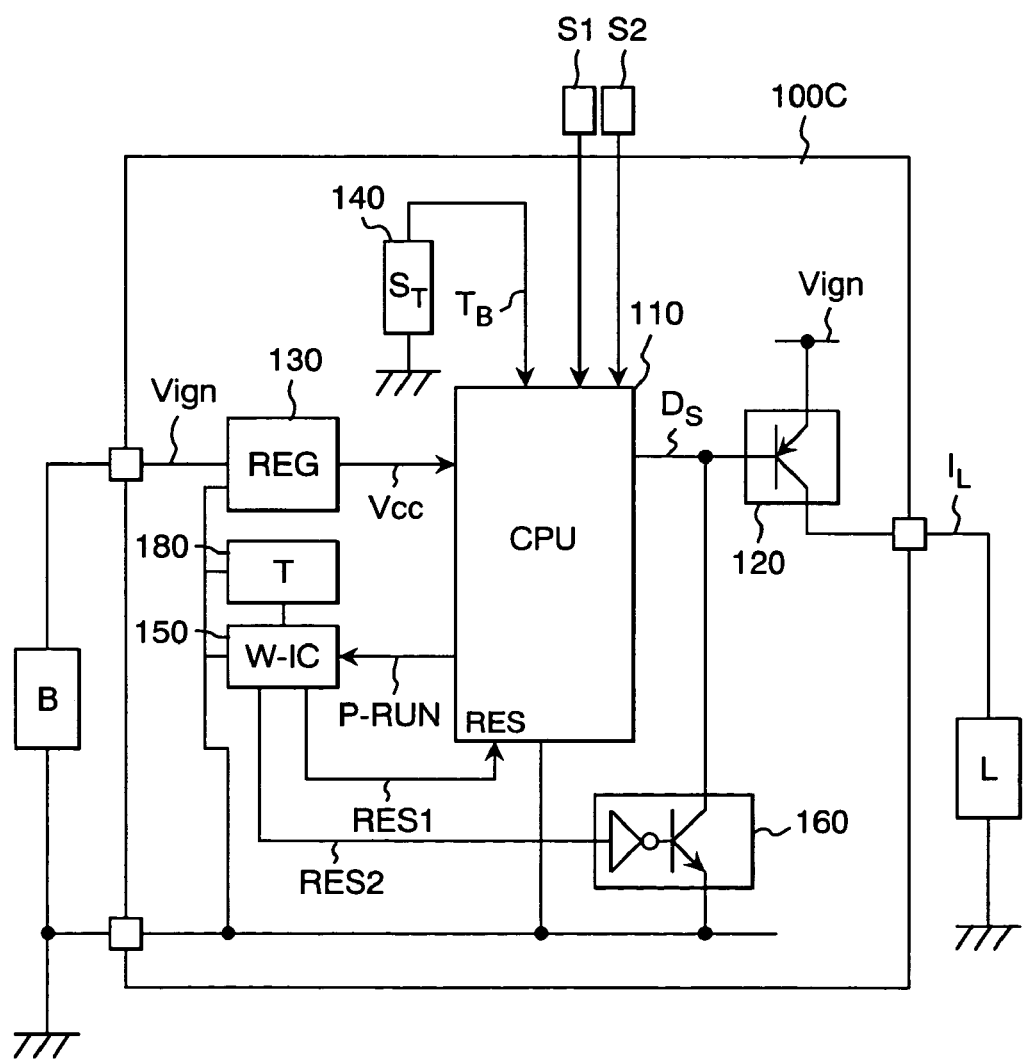
FIG. 6 is a block diagram showing the construction of the control system according to the fourth embodiment of the present invention.
Figure 7:
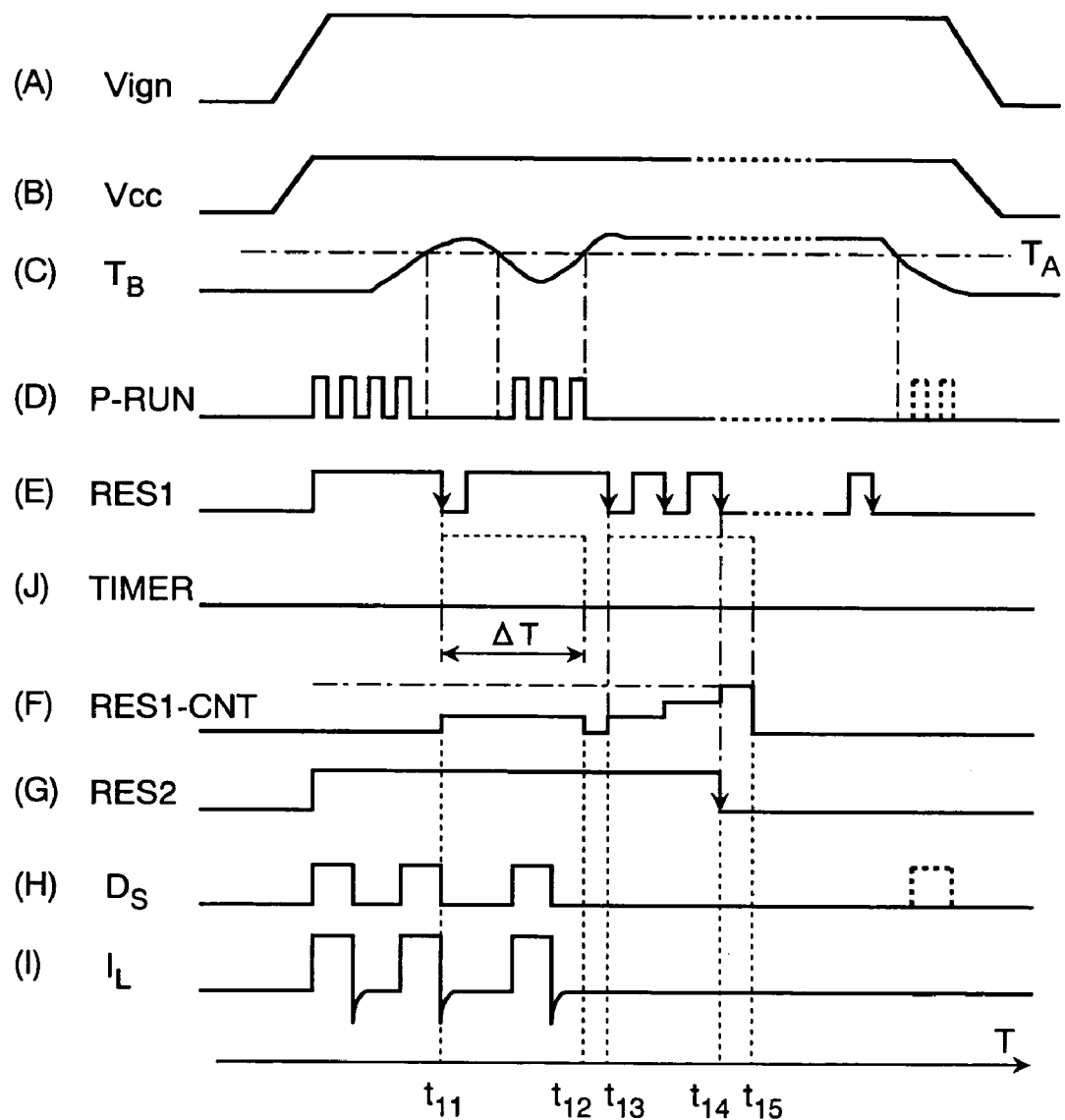
FIG. 7 is a waveform chart showing the operation of the control system according to the fourth embodiment, of the present invention.

Next, the construction of the control system according to the fourth embodiment of the present invention is described hereunder, using FIG. 6 and FIG. 7.

FIG. 6 is a block diagram showing the construction of the control system according to the fourth embodiment of the invention. The same symbols as used in FIG. 1 denote the same parts. FIG. 7 is a waveform chart showing the operation of the control system according to the fourth embodiment of the invention. FIG. 7(A) to FIG. 7(I) are the same as FIG. 3(A) to FIG. 3(I). FIG. 7(J) shows the operation of the timer circuit.

As shown in FIG. 6, the basic construction of the control system 100C is the same in FIG. 1. The control system 100C is additionally equipped with a timer circuit 180 as compared to the control system 100 in FIG. 1. The timer circuit 180 connected to the monitor IC 150 has a specified window width ΔT (ms).

Also in this embodiment, the reset signal RES2 is outputted after the reset signal RES1 have been outputted several times as shown in FIG. 7(G). In addition, in this embodiment, the timer circuit 180 connected to the monitor IC 150 is actuated at the same time when the reset signal RES2 is actuated in a specified length of time ΔT (ms) of the window width as shown in FIG. 7(J).

When an abnormal condition of the CPU 110 continues and the reset signal RES1 are outputted repeatedly, the counter (RES1-CNT) inside the monitor IC 150 adds to the count at every falling end of the reset signal RES1. After the falling end of the reset signal RES1, however, if the reset signal RES1 does not fall for a specified number of times within the time ΔT (ms) of the window width set in the timer circuit 180, the counter of the monitor IC 150 is reset. For example, if a length of time ΔT elapse at time t12 after the counter added to the count at time til1, the count is reset at time t12 as shown in FIG. 7(F).

On the other hand, for example, provided that the length of time ΔT is to elapse at time t15 after the counter added the counts at t12 and if the count has reached a specified number (three times in this embodiment) earlier at time t14 as shown in FIG. 7(F), the reset signal RES2 is outputted as shown in FIG. 7(G). In other words, only when the reset signal RES1 is caused for a specified number of times within a specified length of time T (ms), the reset signal RES2 is outputted.

The count inside the monitor IC 150 will not be reset so far as the ignition key of the automobile is set on. Accordingly, with the construction shown in FIG. 1, if a temporary temperature increase is caused several times and consequently the number of the reset signals RES1 has reached a specified number, output to the load is stopped as the result of a temporary phenomenon. With this embodiment where a window is provided with a timer circuit, on the contrary, the count that has been added to as the result of a temporary temperature increase or the like is reset by the window. Thus, it is possible to avoid a trouble that output to the load is stopped as the result of a temporary phenomenon.

According to this embodiment, it becomes possible not only to be equipped with a high fail-safe function but also capable of avoiding erroneous failure detection as described above. In addition, it is possible to avoid a trouble that output to the load is stopped as the result of a temporary phenomenon.

According to the present invention, it becomes possible not only to be equipped with a high fail-safe function but also capable of avoiding erroneous failure detection.

What is claimed is:

1. A control unit built in a casing of a vehicle automatic transmission, said control unit comprising:

a CPU which outputs a drive signal according to signals from at least one sensor for sensing vehicle operating parameters;

a load drive element which supplies a drive current to a load according to the drive signal;

a temperature sensor which detects a temperature of the control unit;

a monitor circuit which is connected to receive a periodic signal that is output from the CPU whenever the temperature detected by the temperature sensor is below a specified value and the CPU is in normal operation; and a compulsory turn-off circuit which is connected between a control input terminal of the load drive element and ground potential; wherein, the monitor circuit outputs a first reset signal to a reset terminal of the CPU when the CPU fails to output the periodic signal;

the monitor circuit outputs a second reset signal to the compulsory turn-off circuit when the number of the outputs of the first reset signal has reached a specified number;

upon receipt of the second reset signal, the compulsory turn-off circuit turns off the load drive element and stops the supply of drive current to the load, even if the CPU thereafter outputs said periodic signal; and the number of the outputs of the first reset signals is cleared to zero when a key of a vehicle is turned on.

2. A control system according to claim 1, wherein the compulsory turn-off means interrupts the drive signal supplied to the load drive element.

3. A control system according to claim 1, wherein the specified number of times which is a condition of outputting the second reset signal is preselectable.

4. A control system according to claim 1, wherein the monitor circuit outputs the second reset signal when the first reset signal has been output for the specified number of times within a specified length of time.

5. A control system according to claim 1, wherein the monitor circuit sets a failure flag when the second reset signal is output.

6. A control unit built in a casing of a vehicle automatic transmission, said control unit comprising:

a CPU which outputs a drive signal according to signals from at least one sensor for sensing vehicle operating parameters;

a load drive element which supplies a drive current to a load according to the drive signal;

a temperature sensor which detects a temperature of the control unit;

a monitor circuit which is connected to receive a periodic signal that is output from the CPU whenever the temperature detected by the temperature sensor is below a specified value and the CPU is in normal operation; and a compulsory turn-off circuit which is connected in series with said load drive element for interrupting the supply of drive current from said load drive element and said load; wherein, the monitor circuit outputs a first reset signal to a reset terminal of the CPU when the CPU fails to output the periodic signal;

the monitor circuit outputs a second reset signal to the compulsory turn-off circuit when the number of the outputs of the first reset signal has reached a specified number;

upon receipt of the second reset signal, the compulsory turn-off circuit interrupts the supply of drive current to the load, even if the CPU thereafter outputs said periodic signal; and the number of the outputs of the first reset signal cleared to zero when a key of a vehicle is turned on.

7. A control system according to claim 6, wherein the specified number of times which is a condition of outputting the second reset signal is preselectable.

8. A control system according to claim 6, wherein the monitor circuit output the second reset signal when the first reset signal has been output for the specified number of times within a specified length of time.

9. A control system according to claim 6, wherein the monitor circuit sets a failure flag on when the second reset signal is output.

* * * * *